July 12, 1938.    K. RABE    2,123,684
DIFFERENTIAL MECHANISM FOR MOTOR VEHICLES AND THE LIKE
Filed Jan. 10, 1936
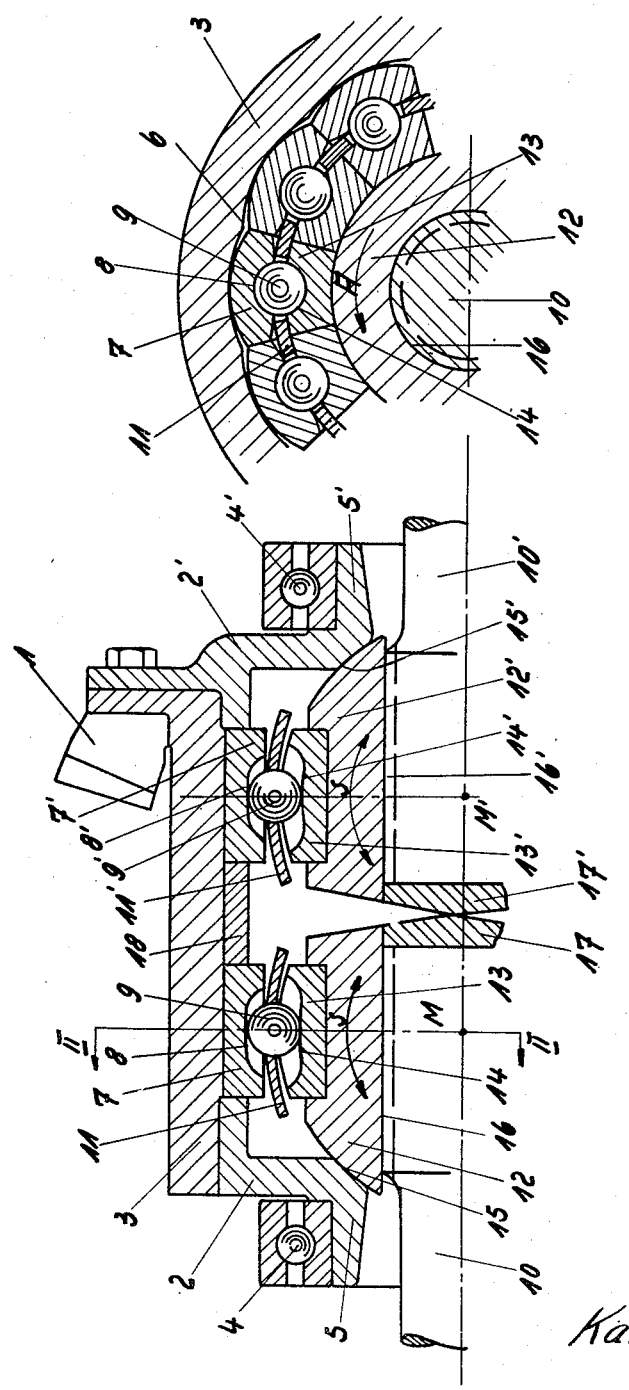
Karl Rabe
Inventor
by A. A. Clarke
Attorney Patented July 12, 1938

2,123,684

UNITED STATES PATENT OFFICE 2,123,684

DIFFERENTIAL MECHANISM FOR MOTOR VEHICLES AND THE LIKE

Karl Rabe, Stuttgart, Germany

Application January 10, 1936, Serial No. 58,585
In Germany January 16, 1935

12 Claims. (Cl. 74—389.5)

My present invention relates to improvements in differential mechanisms for motor vehicles and the like.

An object of this invention is to provide a simple differential mechanism for the transmission of power to shafts which may operate at varying angles.

A further object of this invention is to provide improved means to positively drive a shaft from a driving means while permitting substantially frictionless movements of the shafts relative to the driving means.

A still further object of this invention is to provide in such a device a universal joint of simple construction and one substantially frictionless in operation.

A still further object of the invention is to provide locking elements in a power transmitting differential.

Other objects and features of the invention will be appreciated from consideration of the accompanying specification and drawing showing one possible embodiment of the invention, wherein:

Fig. 1 is a partial cross section approximately in the plane of the driven shafts, and Fig. 2 is a partial section through the transmission on the line II—II of Fig. 1.

As is usual in such devices, a main driving shaft, not shown, terminates in a bevel gear meshing with a main ring gear I carried or formed on a ring or annular shell 3. End plates 2—2' are shown fastened to the ring 3 as by bolts. The ring 3 and end plates 2—2' comprise a closed housing rotatably mounted within an outer casing or differential housing, not shown, by flange extensions 5—5' extending from each end plate plate 2—2'. These flanges 5—5' are supported from the outer housing on ball bearing units comprising balls 4—4'. The end plates 2—2' are provided with spherically finished surfaces 15—15' in contact with correspondingly finished spherical surfaces on the inwardly arranged ring members 12—12'. This construction establishes the relationship between the housing end plates 2—2' and the driven shafts 10—10' to which the rings 12—12' are keyed as at 16—16'. These shafts 10—10' transmit power to their outer extremities where they may each be suitably fastened to sprung traction wheels of an automobile or motor truck thus providing independently sprung traction wheels for vehicles.

Power is transmitted between the outer ring 3 and the inner rings 12—12' keyed to the shafts 10—10' through locking clutch units arranged circularly in contact with one another between the rings. Each locking unit is keystone in shape or is wedge shaped and holds a ball 9 between complementary portions 7 and 13. Each inner portion or member 13 of the locking clutch unit is fitted into a slot around the said inner ring member 12. Each outer face of the outer locking member 7 contacts along a line with a curved recess 6 formed in the member 3, said recesses having a curvature of shorter radius than the distance to the axle 10. The outer face of the locking member 7 is cylindrically curved on a shorter radius than that of the face 6 of the recess in ring 3 with which it cooperates. The ball members are held rigidly between the cooperating members 7 and 13 of the locking driving units against relative movement in the direction A of rotation for power transmission. The outer segment of the locking units are spaced along the outer ring 3 by flanges extending inwardly from the end plates 2—2' and a spacing ring 18 arranged between the segments 7 of the locking units.

Transverse slots 8 and 14 in the respective segments 7 and 13 of the locking driving members are formed at right angles to the direction of driving rotation to adapt this driving system to rocking or oscillation of either or both driving shafts 10 and 10' in the direction of the arrow S by rolling of the balls 9 in said transverse slots, the transverse formation of the slots 8 and 14 being such as to permit of such rolling movement. The center of oscillation M of the shaft or axle 10 is determined by the radius of the portion of spherical surface 15 at the meeting place or bearing area of end plates 2 with or on the inner rings 12 and determines the shape of face plates 17—17' bearing on one another at the ends of the axles 10. The position of the center of oscillation thus remains fixed. The individual balls 9 are held in place by a ball retainer 11. The working parts of the power transmission system as set out herein are to run in a suitable gear grease retained by the outer differential housing, not shown.

In operation, rotational force exerted on the driving ring I sets up radial pressure in the locking driving units 7—13. This pressure results from each cylindrical outer face of a segment 7 moving relatively to the cooperating cylindrical face or camlike contact surface 6 on ring 3, thus clamping the member 13 against the ring 12. Power transmission is made possible over a driven shaft with either or both shafts driving. When no force is exerted over the locking bodies 7—13 there is no clamping effect. When the shafts oscillate due to road inequalities the locking elements 13 are moved relative to the outer elements 7, no resistance of importance being presented to the relative swinging movement of the shafts. It will also be noted that the shafts 10 and 10' are driven at a constant velocity even though they are oscillated out of line with the axis of the ring gear 1.

It will be noted that although the rings 12 and 12' are separate from the shafts 10 and 10' they may be regarded as a part thereof.

The scope of this invention is not to be considered as limited to the specific disclosure herein. Having disclosed my invention and the manner of its use so that it can be practiced by one skilled in the art, I claim:

1. In a differential mechanism for motor vehicles and the like, a journaled driving member formed with a plurality of inwardly faced curved seats, a shaft, and means for connecting said driving member to said shaft comprising clutching means bearing upon said curved seats along a line and formed with an arcuate surface concentric with said shaft and bearing thereupon.

2. In a differential mechanism for motor vehicles and the like, a journaled driving member formed at spaced parts thereof with a plurality of inwardly faced curved seats, a pair of oppositely extending shafts and means for connecting said driving member to said shafts comprising two sets of clutching means bearing upon said curved seats along a line and formed with an arcuate surface concentric with said shaft and bearing thereupon.

3. In a differential mechanism for vehicles and the like, a journaled driving member formed with a plurality of inwardly faced curved seats, a shaft, and means for connecting said driving member to said shaft comprising clutching means bearing within said curved seats along a line and bearing upon a surface upon said shaft, said clutching means including a member located in each of said seats, and a member movable relative thereto and having a cylindrical surface bearing upon said shaft.

4. The combination according to claim 3 including a ball located between said last mentioned members.

5. A combination according to claim 3 including a ball located between said last mentioned members, said members being formed with recesses to receive said ball.

6. In a differential mechanism, a driving member having a plurality of recesses, means for journaling said driving member, a driven shaft, means for mounting said driven shaft for universal movement relative to said driving member, and intermediate clutching means engaging said recesses in said driving member and engaging said shaft.

7. The combination according to claim 6 wherein said recesses comprise curved seats, and said clutching means each comprises an element located within said curved seats, an element engaging said shaft, and means therebetween to transmit radial thrust and torque.

8. The combination according to claim 6 wherein said recesses comprise curved seats, and said clutching means each comprises an element located within said curved seats, an element engaging said shaft, and a ball between said elements seated in transverse recesses therein, whereby said clutch means serve to transmit torque from said driving member to said shaft.

9. A clutching device for power transmission between shafts including a ring on a driving shaft, a ring on a driven shaft, with the rings connected by a plurality of clutching units each made up of a plurality of parts, a ball disposed between co-operating parts of a clutch unit and arranged on driving of one of the shafts to exert a clamping effect through the co-operating parts of the clutch so that one part of each clutch engages a ring along a line and the other part of the clutch engages the other ring on a surface.

10. The combination as in claim 9 with slots in the clutch members disposed transversely to the line of driving force, with a cage for retaining the balls.

11. A clutch unit consisting of a pair of wedge-shaped members, one of said members having an outer convex working face and an inner face provided with a co-operating socket portion for a ball member, and the other of said members having an inner concave working face and an outer face provided with a co-operating socket portion for a ball member, the axis of curvature of said outer convex face lying radially outwardly of the axis of curvature of said inner concave face, and a ball member in said co-operating socket portions.

12. A differential mechanism for an automobile or the like including a ring gear member, end plates attached to the ring gear member to form a housing, a mounting means within the housing for a shaft to be driven, clutch segments mounted on the driven shaft, other clutch segments mounted exteriorly of the first mentioned segments to contact, in operation, with the driving ring gear, a slot in each inner surface of the inner and outer clutch segments with its axis parallel to the axis of the ring gear and a ball in each of the slots of the inner and outer clutch segments.

KARL RABE.